(12) United States Patent
Beller et al.

(10) Patent No.: US 8,089,864 B2
(45) Date of Patent: Jan. 3, 2012

(54) NETWORK RESTORATION

(75) Inventors: Dieter Beller, Korntal (DE); Hans-Jörg Jäkel, Stuttgart (DE)

(73) Assignee: Alcatel Lucent, Paris (FR)

( * ) Notice: Subject to any disclaimer, the term of this patent is extended or adjusted under 35 U.S.C. 154(b) by 1421 days.

(21) Appl. No.: 10/885,593

(22) Filed: Jul. 8, 2004

(65) Prior Publication Data

US 2005/0013241 A1 Jan. 20, 2005

(30) Foreign Application Priority Data

Jul. 18, 2003 (EP) .................................. 03291785

(51) Int. Cl.
*H04J 3/08* (2006.01)
*H04L 12/24* (2006.01)

(52) U.S. Cl. ........................................ 370/222; 370/225
(58) Field of Classification Search .................. 370/225
See application file for complete search history.

(56) References Cited

U.S. PATENT DOCUMENTS

| | | | | |
|---|---|---|---|---|
| 5,495,471 A * | 2/1996 | Chow et al. | ................... | 370/221 |
| 5,548,639 A * | 8/1996 | Ogura et al. | ................... | 379/221.04 |
| 5,646,936 A * | 7/1997 | Shah et al. | ..................... | 370/228 |
| 5,832,196 A * | 11/1998 | Croslin et al. | ..................... | 714/4 |
| 6,026,077 A * | 2/2000 | Iwata | ............................. | 370/254 |
| 6,163,525 A * | 12/2000 | Bentall et al. | .................. | 370/227 |
| 6,952,395 B1 * | 10/2005 | Manoharan et al. | .......... | 370/219 |
| 6,987,727 B2 * | 1/2006 | Fredette et al. | ................ | 370/225 |
| 7,035,206 B2 * | 4/2006 | Brewer et al. | ................. | 370/222 |
| 7,342,890 B1 * | 3/2008 | Ferguson | ...................... | 370/238 |
| 2003/0133417 A1 | 7/2003 | Badt, Jr. | | |
| 2005/0088963 A1 * | 4/2005 | Phelps et al. | .................. | 370/216 |

FOREIGN PATENT DOCUMENTS

EP 1 246 396 A2 10/2002

OTHER PUBLICATIONS

ITU-T G.707/Y.1322 dated Oct. 2000—Network Node Interface for the Synchronous Digital Hierarchy (SDH).
ITU-T G.709/Y.1331 dated Feb. 2001—Interfaces for the Optical Transport Network (OTN).
ITU-T G.841 dated Oct. 1998—Types and Characteristics of SDH Network Protection Architectures.
Zhao Huiling et al, The Network and Switching Standard Research—ASON—, w/English Abstract.

* cited by examiner

*Primary Examiner* — Chi Pham
*Assistant Examiner* — Soon-Dong Hyun
(74) *Attorney, Agent, or Firm* — Sughrue Mion, PLLC

(57) ABSTRACT

A method of restoring an active path between two nodes of a transport network upon occurrence of a failure includes the steps of determining an alternate path through the network and establishing a path protection involving the failed active path and the alternate path. If in layered networks, a failed path is restored at a lower layer and at a higher layer concurrently, the restoration actions in the higher network layer can thus be reverted easily.

11 Claims, 1 Drawing Sheet

NETWORK RESTORATION

The invention is based on a priority application EP 03291785.8 which is hereby incorporated by reference.

FIELD OF THE INVENTION

The present invention relates to the field of telecommunications and more particularly to a method and related network management system for restoring a path through a transport network upon occurrence of a failure.

BACKGROUND OF THE INVENTION

Transport networks serve for the physical layer transport of high bitrate tributary signals. In particular, the signals transmitted over a transport network are encoded and multiplexed into a continuous bit stream structured into frames of the same length. Within this constant bitrate bit stream, the frames are repeated periodically with a frame repetition rate of typically 8 kHz and are substructured according to a multiplexing hierarchy. An example of such a multiplexing hierarchy is SDH (Synchronous Digital Hierarchy, see ITU-T G.707 October 2000) where the frames are termed synchronous transport modules of size N (STM-N, where N=1, 4, 16, 64, or 256). The frames have a section overhead and contain at least one higher order multiplexing unit called virtual container VC-4, which can either directly carry a tributary signal or a number of lower order multiplexing units like VC-12 or VC-3, which then carry tributary signals.

Virtual containers are transmitted from source to sink through an SDH network and therefore represent a "logical" path through the network. The sequence of identical VCs having the same relative position in subsequent frames forms a traffic stream along that path. Each VC contains a path overhead (POH) and a payload section referred to as a container (C). The US equivalent of SDH is known as SONET (Synchronous Optical Network).

Another well known transport network with similar multiplexing units is the recently defined Optical Transport Network OTN; see ITU-T G.709, February 2001. In the OTN, the transport signals are colored, wavelength multiplexed signals and the multiplexing unit that defines a path is a single wavelength channel thereof. The design of the OTN allows it serve also as a server layer for an SDH transport network.

A transport network itself consists of a number of physically interconnected network elements such as crossconnects, add/drop multiplexers and terminal multiplexers. Traditional transport networks are managed centrally. This means that a central network manager has the overview about the topology and status of the network and if a customer desires a new connection for a tributary signal, the network operator manually establishes via his network management system a corresponding path through the transport network. Thus, paths through a centrally managed network are created under the control of the central network management system, which instructs all affected network elements (potentially using intermediate lower level network management facilities) to setup corresponding crossconnections to establish the new path.

Recent evolution, however, led to the introduction of a distributed control plane and the definition of a related protocol known as GMPLS (Generalized Multi-Protocol Label Switching). The underlying principle is that each network element has its own GMPLS controller. The GMPLS controllers in the network communicate with each other over a dedicated data network, known as the control plane, to find an available route through the network, coordinate path set-up and configure their corresponding network elements accordingly to automatically establish the dynamically agreed path. Each GMPLS controller must therefore have a complete knowledge about the topology and status of its network domain and about gateway nodes to other domains. An OSPF protocol (Open Shortest Path First), slightly extended to the particular needs of a GMPLS-controlled transport network, is used to communicate (or "advertise") the status of the transport network from one GMPLS controller to the other. Each controller has a database where it stores the topology data of the network according to its latest knowledge.

A very basic aspect in all types of transport networks is availability and reliability of service. In other words, a transport network must be very robust against any kind of failure and the average outage time must be very low. Hence, a transport network needs to provide the means and facilities to ensure sufficient availability. Typically, network mechanisms which ensure this availability are distinguished in protection and restoration. The common principle of both is to redirect traffic of a failed physical link or logical path over a spare resource.

The subtle distinction between restoration and protection is made based on the resource allocation done during the recovery state. Resource allocation means here the active use of a resource, i.e., the resource caries traffic. The recovery state is the status when the traffic is restored over the spare path. For a protection mechanism, the resources are assigned prior to any failure, while for restoration, the resources are assigned only after occurrence of a failure.

Protection is a mechanisms where an already established protection path or link is assigned to one selected high-priority path or link (known as 1+1 or 1:1 protection, depending on whether there is low priority extra traffic on the protection resource or not) or a group of n such selected paths or links (known as 1:n protection). In the case of a failure, traffic can be restored very fast over the previously established protection resource under the sole control of the affected network elements in typically less than 50 ms. However; this requires a protocol between the affected nodes to signal and synchronize switch-over.

Protection is a high-quality service restricted to few selected premium connections, which are typically charged at a higher price. Moreover, protection requires a high amount of spare resources compared with the amount of protected resources, i.e., 100% of spare capacity in the case of 1+1 protection.

Restoration refers to a mechanism, where the network searches for restoration capacity and establishes a restoration path only after a service path failure. Typically, connections are restored upon the occurrence of a failure by setting up a new path and by deleting the failed one. Rather than calculating the restoration path after failure, pre-calculated restoration routes can be used instead but with the actual crossconnection to establish the pre-calculated path performed after failure. Restoration mechanisms are more stringent in the usage of spare capacity and, however, provide a masking of the failure at a lower speed, typically in the range of a few seconds as completely new paths through the network must be established.

In an automatically switched optical transport network, restoration actions are distributed among the entire network. The GMPLS controllers of the affected network elements need to determine from their routing information possible alternate routes and negotiate path set-up with the counterpart controllers along that path.

A problem may arise in GMPLS-controlled transport networks or in multi-layered transport networks, when concurrent restoration actions interfere with each other. In other words, a failure that has happened in a lower network layer may trigger restoration actions in a higher layer but also concurrent restoration actions in the lower layer itself. This may lead to unnecessary and unwanted re-configuration steps and may delay the restoration.

SUMMARY OF THE INVENTION

It is therefore an object of the present invention, to provide an improved restoration method and related network management plane for transport networks.

These and other object that appear below are achieved by a method which establishes in the case of a failure a temporary 1+1 path protection involving the failed path and an alternate restoration path. In particular, the method determines an alternate restoration path through the network and establishes a path protection with the restoration path protecting the failed path. Traffic is duplicated at the first terminating node from the failed path to the alternate path and the second terminating node switches to receive traffic over the alternate path but continues to monitor the failed path. If the failure condition persists, the second node continues to receive the traffic signal from the alternate path. Otherwise, if the failure condition disappears, the second node switches back to the original path and removes the path protection again. If after a predetermined period of time, the failure still persists, the method may cease the temporary protection and delete the failed path.

Restoration according to the invention can be revertive or non-revertive, which means that after the failure has been repaired some time later, the original configuration may be re-established or the configuration over the alternate path may be maintained.

It has been observed that restoration according to the invention will be performed in about the same time as traditional restoration without temporary protection circuit and that hence there is no difference in the performance of the two mechanisms. It further has the advantage that it will work even in the case of two unidirectional failures.

BRIEF DESCRIPTION OF THE DRAWINGS

Preferred embodiments of the present invention will be described below with reference to the accompanying drawings in which.

DETAILED DESCRIPTION OF THE INVENTION

Figure 1:
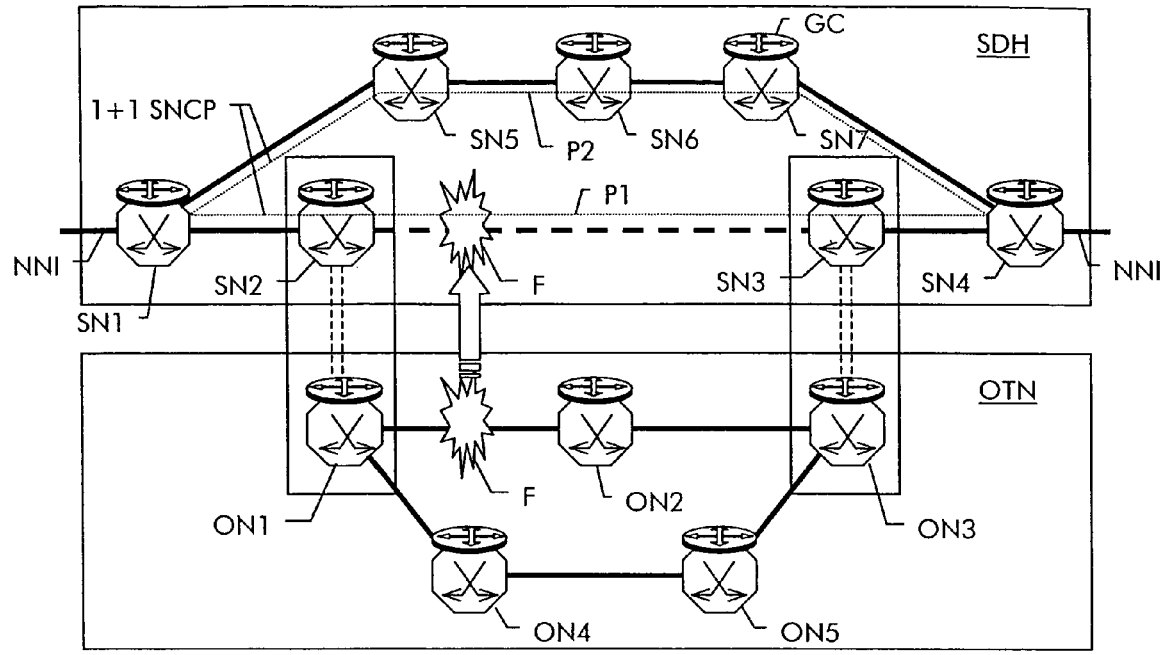
FIG. 1 shows a failure in an optical transport network serving a SDH network and the restoration paths to recover the failure and FIG. 2 shows a network with a first active path and restoration path.

FIG. 1 shows by way of a non-limiting example a layered transport network which contains a first lower layer network OTN composed of network elements ON1 to ON5 and a second higher layer network SDH composed of network elements SN1 to SN7. The lower layer network is an optical transport network OTN as defined in ITU-T G.709. ON1 is physically connected to ON2 and to ON4, ON2 is connected to ON3 and ON5 is connected to ON4 and to ON3. The interconnections are optical fibers and carry wavelength multiplexed signals, where each wavelength represents a multiplex unit in the OTN.

The higher layer network is an SDH network as defined in ITU-T G.707. SN1 is connected to SN2 and to SN5, SN6 is connected to SN5 and SN7 and SN4 is connected to SN3 and SN7. Between SN2 and SN3 exists a connection which uses a wavelength channel through the underlying OTN from ON1 over ON2 to ON3. In the OTN, a path exists thus for the SDH client layer between ON1 and ON3 across ON2.

Both networks OTN and SDH have a distributed control plane, each, and are controlled according to the GMPLS protocol. Therefore, each network element has its own GMPLS controller GC symbolized in the figure by an arrowed disk or "halo" on top of each network element. The GMPLS controllers within one network layer communicate with each other over a data communication network (not shown in the figures) and control the network elements according to the decisions of the local controllers.

In the example chosen, a path P1 for an external traffic signal (fed to SN1 and SN4 via the network node interface NNI) exits between network elements SN1 and SN4 via network elements SN2 and SN3. The physical connection between ON1 and ON2 in the OTN, however, is subject to a failure F, e.g., a fiber break. Thus, in the SDH network, the connection between SN2 and SN3 is affected by the very same failure F as this connection uses the aforementioned wavelength channel along the failed link in the OTN. Restoration actions are thus necessary, to restore the failed traffic signal from path P1.

In this scenario, two alternatives would in principle be available to restore the failed path P. Either the path could be restored in the client layer network SDH from SN1 over SN5, SN6, and SN7 to SN4, or traffic on the broken path in the OTN could be restored from ON1 over ON4 and ON5 to ON3. As the two network layers SDH and OTN are completely distinct from each other and the control plane of the one has no knowledge about neither the existence nor the configuration of the other, concurrent restoration actions may occur in the two networks and it would be more or less accidental which restoration would succeed and restore the failure first. It may either happen that the OTN restores the failure before restoration in the SDH network could be finished and that the control plane of the SDH network recognizes this fact timely to stop its restoration actions before completion, or it may happen that the SDH layer succeeds first and that the restoration in the OTN comes to late so that path P1 indeed will finally be restored but no longer needed. Nevertheless, the SDH layer cannot wait for the traffic to be restored by a lower network layer of which it has no knowledge, because if this will not happen, restoration would be unnecessarily delayed and outage time for the external traffic extended.

The invention recognises this deficiency and it is a basic idea of the present invention to establish in the SDH network a temporary 1+1 path protection for the failed path, which could be reverted if the failure vanished due to restoration action in the OTN some time later. Such a path protection is also referred to as sub-network connection protection (SNCP).

In the first embodiment, the control plane (i.e., the GMPLS routers of SN1 and SN4) determine a restoration path P2 for the failed path P1. Then the control plane configures a protection circuit involving the failed path P1 and the second path P2. As a path protection is always performed and terminated at the lowest hardware level to achieve fast recovery time (typically 50 ns), the terminating network elements SN1 and SN4 need to be configured for the protection by their GMPLS controllers. This involves then, that the first terminating network SN1 duplicates the traffic signal from the failed path P1 to the alternate path P2. The second terminating network element SN4 monitors the two paths of the 1+1 SNCP thus created and automatically selects the better of the two signals. In the present case, SN4 will select the traffic signal from P2, which means that the failed traffic is restored. The path protection is configured as revertive, i.e., path P1 is preferred for reception of traffic. If path P1 will occasionally be restored, SN4 automatically switches back to P1 for reception of the traffic signal in question. Therefore, if the failure will be masked due to restoration actions at a lower network layer, the restored connection will indeed be used again by the SDH network.

The 1+1 SNCP is, however, only temporary. If the failed path returns, the path protection is removed again and traffic received again from P1. Conversely, if the failure persists and P1 remains disturbed for a certain amount of time (e.g., some seconds), then the path protection can also be deleted together with failed path P1 and traffic permanently received from P2. In the latter case, the restoration result in the SDH layer is made permanent.

It should be noted that the network elements SN2 and ON1 as well as the network elements SN3 and ON3 may be implemented as a single network element equipped to serve the SDH and the OTN layer, both.

The described 1+1 SNCP has the biggest advantage in a multi-layer network where restoration actions can be done at different layers independently, e.g. in the case of an SDH network which utilizes an OTH network for inter-connecting SDH network elements, where restoration can be performed in the SDH layer (client layer) and in the OTH layer (server layer). If a failure had occurred in the OTH layer (server layer) affecting also the SDH paths which are transported over the OTH trail, restoration actions could principally be triggered in both layers independently. If restoration is progressing in both layers and restoration actions are completed in the server layer earlier than in the client layer, the traffic in the client layer is restored faster in case of a 1+1 SNCP than without. The SNCP in the client layer can be cancelled as soon as the failure has persistently disappeared and the resources along the backup route in the client layer (2nd leg of the SNCP) can be released. In the other case, when the server layer cannot successfully restore the server layer trail, the SNCP of the client layer could successfully restore the path by switching to the 2nd leg.

However, the proposed 1+1 SNCP based mechanism even allows to co-ordinate multiple (typically two) concurrent restoration activities within the same layer: e.g. local restoration and ingress-to-egress restoration.

Figure 2:
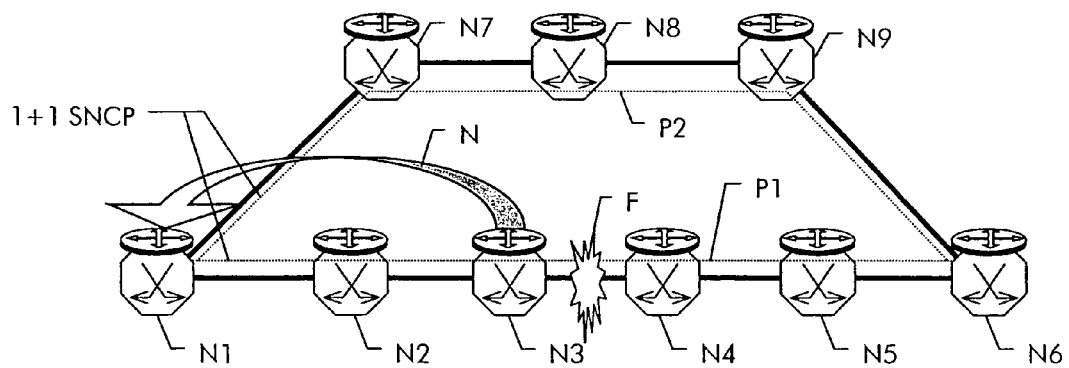

This is shown in FIG. 2, where network elements N1 to N9 are connected to form a transport network. In particular, N1 is connected to N2 and N7, N3 is connected to N2 and N4, N5 is connected to N4 and N6, N9 is connected to N6 and N8 and N8 is in turn connected to N7. A first active path P1 is established between N1 and N6 along network elements N2, N3, N4, and N5. However, the link between N3 and N4 is affected by a failure F and path P1 thus interrupted. N1 is notified of the failure by N3 through failure notification N. The notification may either be send on control plane level or using a tandem connection monitoring function (TCM) on path level.

As the network has a distributed control plane, restoration may be started by either the nodes adjacent to the failure, i.e., N3 and N4 in the case of local repair, or by the far end nodes terminating the failed path in the case of end-to-end recovery, i.e., N1 and N6. Depending on the activated restoration mechanisms in the network, multiple restoration actions may progress concurrently in the network.

The invention provides here a solution. In particular, the GMPLS controller of N1 searches an alternate path P2 leading along N7, N8, and N9 to N6, which path is then established. Then the controllers of N1 and N6 configure a 1+1 SNCP involving P1 and P2. Once the SNCP is established, N6 automatically selects the traffic from the restoration path P2 as long as the failure F persists and returns to path P1 if the failure vanishes.

In case of a GMPLS-controlled network, the 1+1 SNCP is established by means of signalling messages which are sent hop by hop from ingress to egress node along the backup path that will form the new 2nd leg of the SNCP. While the path message traverses the network along the backup path, the SNCP protection group on the ingress side (node N1) as well as the cross-connections in the intermediate nodes (nodes N2, N3, N4, N5) can be created immediately in order to minimise the overall restoration time.

When the egress node (node N6) has received the path message, the SNCP protection group can be created and a "Resv" message traverses back the same way. The selector will select a valid signal from either leg (most likely the 2nd leg, the backup path). If another restoration activity delivers a valid signal at the 1st leg in a faster way (e.g. by means of local repair), the selector does not switch to the 2nd leg.

While in the examples above, only one direction of transmission has been considered, it would be clear to those skilled in the art, that the paths and connections are typically bi-directional.

A minor advantage of the invention is the fact that the 1+1 SNCP even works in the case of two unidirectional failures: one on either leg in the two different directions.

Backup routes, i.e., the 2nd leg of the SNCP, can either be pre-calculated or can be calculated upon reception of the failure notification.

If the restoration is non-revertive and the restored path becomes the so-called 'nominal' path, the 1+1 SNCP can be removed when the path has been successfully recovered. If it works stable over the 2nd leg of the SNCP, this leads to the same result as if the failed path was deleted and a new path was established using the conventional mechanism.

If the restoration shall be revertive, the SNCP may keep the resources along the nominal path (1st leg) and can be configured to work in a revertive mode including a wait-to-restore time preventing the path to switch back and forth in case a failure which disappears for short amounts of time—once the reversion has been completed (failure fixed and wait-to-restore time expired) the SNCP can be removed (2nd leg is released, nominal path is kept).

If, however, the resources along the (failed) nominal path shall be released temporarily while the path is using the backup resources due to a failure and the restoration shall be revertive, the 1+1 SNCP can be removed as soon as the path has reached a stable state over the 2nd leg. This leads to a release of the resources along the nominal path.

The 1+1 SNCP can also be established in the traditional way through a central network management system (not shown in the examples), rather than through a distributed control plane.

It should be noted that the network topologies of the two examples are simplified and reduced and that in reality a plurality of additional nodes and interconnections may exist. To give a more realistic figure, a large network element such as a crossconnect has a typical capacity to handle several hundreds of multiplex signals.

Although having described two preferred embodiments of the invention, those skilled in the art would appreciate that various changes, alterations, and substitutions can be made without departing from the spirit and concepts of the present invention.

What is claimed is:

1. A method of restoring an active path for transmission of data between two nodes of a transport network upon occurrence of a failure, comprising the steps of
   determining an alternate path through the network and
   establishing a path protection circuit involving the failed active path and the alternate path and simultaneously transmitting said data on both of said failed active path and said alternate path, wherein said protection circuit uses said alternate path under control of network nodes at either end of said alternate path.

2. A method according to claim 1, wherein the path protection circuit prefers the failed active path and automatically reverts selection once the signal on the active path returns.

3. A method according to claim 1, wherein the path protection circuit is temporary only and removed after a predetermined amount of time.

4. A method according to claim 1, comprising the steps of
   at the first node, duplicating traffic from the failed active path to the alternative path;
   at the second node, switching to receive traffic over alternative path;
   monitoring the failed path and if the failure persists, continuing to receive said traffic from the alternative path and removing the path protection otherwise.

5. A method according to claim 1, wherein the network is controlled by a distributed control plane and the path protection circuit is established by means of signalling messages which are sent hop by hop along the alternate path from the first to the second node terminating the failed path.

6. A method according to claim 1, wherein said protection circuit is such that said alternate path is used during failure of the active path but otherwise the active path is used.

7. A control plane for a transport network for restoring an active path for transmission of data between two nodes of a transport network upon occurrence of a failure, the control plane including a physical computer-readable medium storing a program which when executed causes said control plane
   to determine an alternate path through the network and
   to establish a path protection circuit involving the failed active path and the alternate path and transmit said data simultaneously over both of said failed active path and said alternate path, wherein said protection circuit uses said alternate path under control of network nodes at either end of said alternate path.

8. A control plane according to claim 7 comprising a number of controllers, each being assigned to one of the network elements of the transport network, the controllers communicating over a control network and comprising local routing information to determine alternate paths through the network.

9. A control plane according to claim 7 being a central network management system adapted to centrally control and configure the entire transport network.

10. A control plane according to claim 7, wherein said protection circuit is such that said alternate path is used during failure of the active path but otherwise the active path is used.

11. A method of restoring an active path between first and second nodes of a transport network upon occurrence of a failure, comprising the steps of
    determining, by one of a distributed control plane or a central network management, an alternate path through the network from the first node to the second node;
    establishing the alternate path in the network;
    configuring the first and second nodes to establish a sub-network connection protection involving the failed active path and the alternate path; said sub-network connection protection comprising in the first node a bridge duplicating traffic from the failed active path to the alternate path and in the second node a monitor for detecting a signal failure on the failed active path and a selector for automatically switching from the failed active path to the alternate path in response to the detection of a signal failure at the monitor, thereby restoring traffic from the failed active path.

* * * * *